April 29, 1969  B. C. CRANAGE  3,441,046
SECONDARY POPPET AND PUSHER SYSTEM
Filed March 23, 1967  Sheet 1 of 2
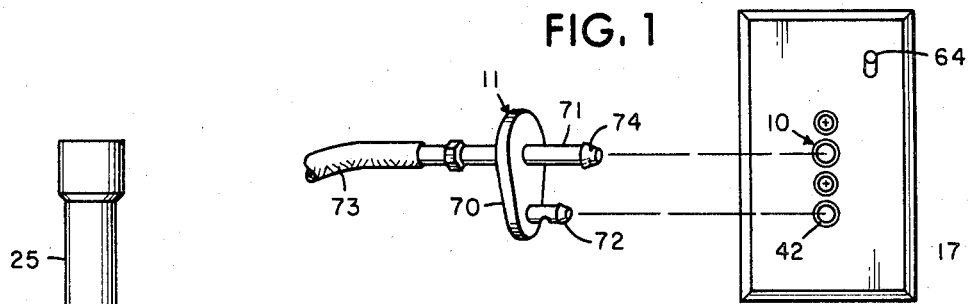
FIG. 1
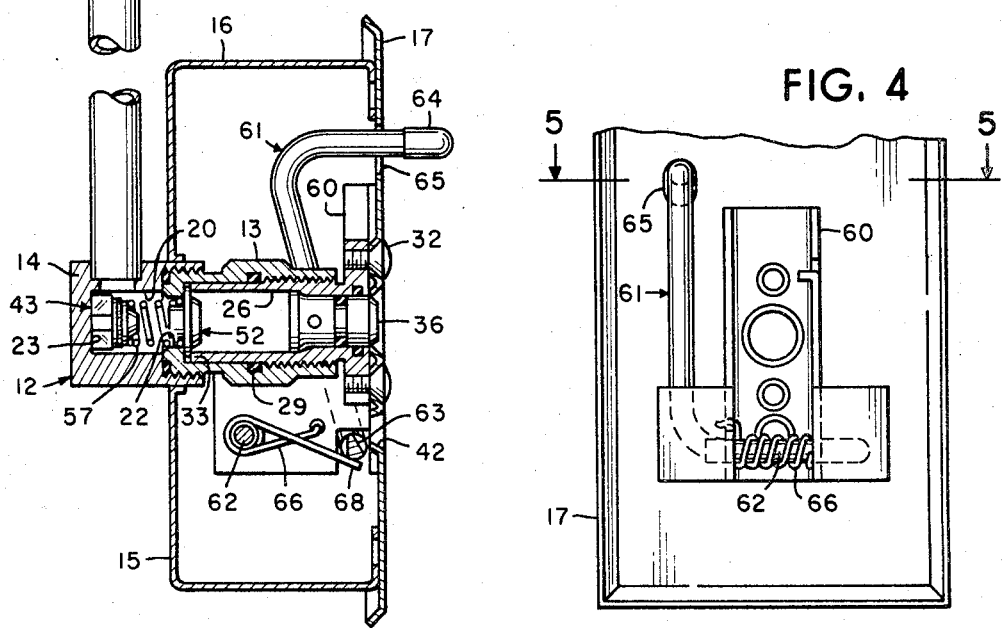
FIG. 4
FIG. 2
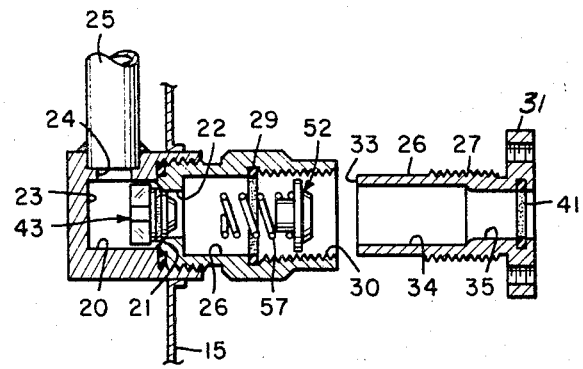
FIG. 3
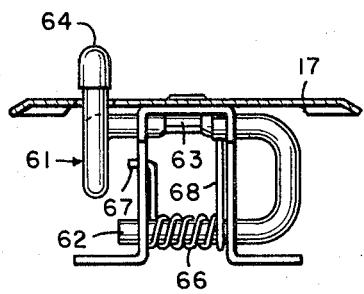
FIG. 5
INVENTOR
BIDWELL C. CRANAGE
BY
Cohn and Powell
ATTORNEYS

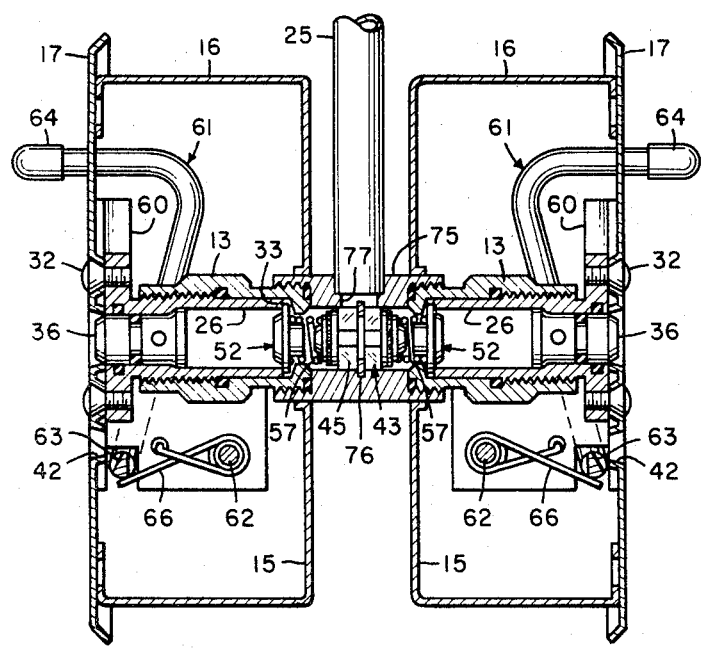
FIG. 6
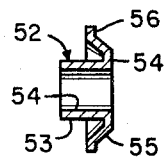
FIG. 8
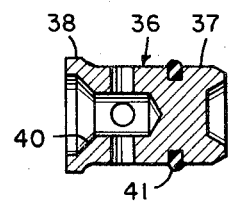
FIG. 9
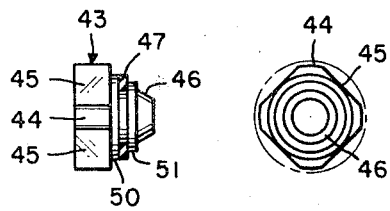
FIG. 10   FIG. 11
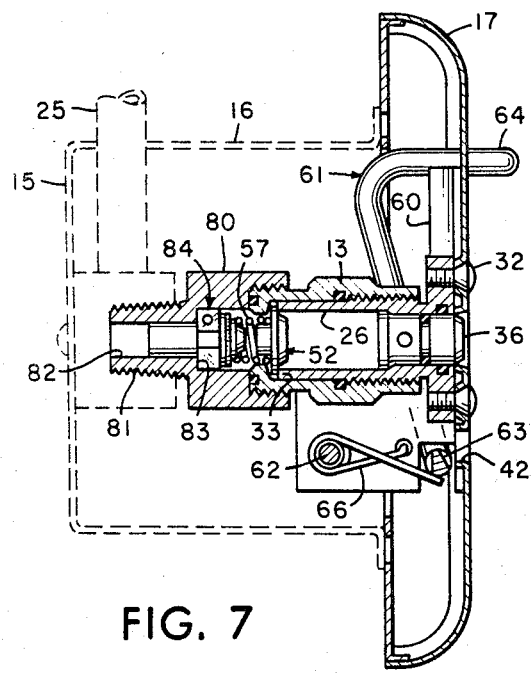
FIG. 7
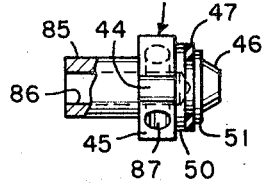 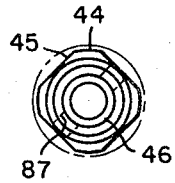
FIG. 12   FIG. 13
INVENTOR
BIDWELL C. CRANAGE
BY
Cohn and Powell
ATTORNEYS

United States Patent Office 3,441,046
Patented Apr. 29, 1969

3,441,046
SECONDARY POPPET AND PUSHER SYSTEM
Bidwell C. Cranage, Ferguson, Mo., assignor to Stile-Craft Manufacturers, Inc., St. Louis, Mo., a corporation of Missouri
Filed Mar. 23, 1967, Ser. No. 625,456
Int. Cl. F16k 15/06
U.S. Cl. 137—329.1           17 Claims

ABSTRACT OF THE DISCLOSURE

A secondary poppet valve means operatively connected by a compression spring to a thrust washer, the spring tending to urge the poppet valve means and thrust washer apart. The poppet valve means and thrust washer are slidably mounted in a longitudinal chamber of the base of a supply terminal assembly. A tubular socket member, carried by the base and received in the chamber, engages and positions the thrust washer longitudinally in the chamber while the spring holds the poppet valve means away from the valve port. The thrust washer follows the tubular socket member under spring loading during withdrawal of the socket member from the chamber, and the poppet valve means closes the valve port under pressure exerted in the chamber at one side of the valve port when the tubular socket is withdrawn.

Background of the invention

This invention relates generally to improvements in the socket assembly of a quick-connect-disconnect coupler adapted for a wall mounting as a flush-type outlet fixture, and more particularly to an improved secondary poppet valve means and actuating system for the poppet valve means.

The apparatus has particular application and service in hospitals, laboratories and industrial plants or wherever it is desired to provide a number of conveniently located supply outlets for fluid and suction lines. Wall outlets for oxygen and vacuum, for example, are standard equipment in a modern hospital. A hose may be quickly and simply plugged into a convenient fluid supply terminal assembly disposed in the building wall, and with equal facility unplugged.

A wall outlet of this general type is disclosed in U.S. Patent No. 2,908,511 owned by the common assignee. In this prior patent and other known art, the secondary poppet valve includes a ball or like element directly engaged by the end or side of a movable, internal socket member to open the secondary valve port. Upon withdrawal of the socket member, the ball will be disengaged and a spring behind the ball will urge the ball against the ball seat to close the secondary port. The spring, behind the ball, takes considerable space and adds to the manufacturing costs. Moreover, the secondary valve means, utilizing the heretofore conventional spring and ball check, had proven unreliable in the specific field of use.

Summary of the invention

The supply terminal assembly eliminates the provision of a compression spring behind the secondary poppet valve means, and effectively shortens the length of the chamber in which the poppet valve means is located, thereby affording a compact unit having reliable sealing characteristics.

A thrust washer is located in the chamber and is engageable and movable with the tubular socket member. A poppet valve means is slidably mounted in the chamber at one side of the valve port. A resilient means tends to move the thrust washer and poppet valve means apart.

The tubular socket member positions the thrust washer in the chamber while the resilient means holds the poppet valve means away from the valve port for flow through the valve port. The thrust washer follows the tubular socket member of the resilient means during withdrawal of the socket member from the chamber, and the poppet valve means closes the valve port under pressure exerted in the chamber at the one side of the port when the socket member is withdrawn.

The thrust washer includes a flange engageable with the end of the tubular socket member for positioning the thrust washer in the chamber. Specifically, the annular flange has a substantially frusto-conical nose interfitting the end of the tubular socket member, and has an integral, radial shoulder engaging the end of the tubular socket member. In addition, the thrust washer includes a tubular washer body extending into the valve port and having a passage for flow therethrough.

The resilient means includes a compression spring having one end located about the tubular washer body and engaging the flange. The spring is disposed between the tubular washer body and the margin of the valve port, the spring engaging the valve port margin to guide movement of both the thrust washer and poppet valve means.

The base provides a support for the poppet valve means at one side of the valve port, the poppet valve means being urged against the support by the resilient means. A supply port communicates with the side of the chamber between the support and the valve port. In one embodiment, the poppet valve means includes an elongate body slidably mounted and guided in the supply port which is located in the base support behind the poppet valve means. Such elongate body is provided with the passage placing the supply port in communication with the chamber.

In another embodiment, the coupler assembly includes a supply terminal assembly having oppositely disposed and interconnected stations adapted to receive and coact with a pair of tubular plugs. In each section of the supply terminal assembly, there is provided a poppet and pusher system in which the thrust washer is positioned longitudinally in its associated chamber by engagement with an associated tubular socket member, and each poppet valve means is held away from its associated valve port and against an intermediate base support under loading of a compression spring upon positioning of the associated thrust washer by the associated tubular socket member. During withdrawal of each tubular socket member, the associated thrust washer will follow the tubular socket member and will allow the associated poppet valve means to close the associated valve port. Each section of the supply terminal assembly is operatively connected to a common supply port at the side of the axially aligned chambers between the pair of poppet valve means.

Brief description of the drawing

FIG. 1 is a perspective view of the hose terminal fitting and a front elevational view of the flush-type outlet;

FIG. 2 is a cross-sectional view of the coupler assembly mounted in a wall, and showing the main valve closed and the secondary valve open;

FIG. 3 is a fragmentary, cross-sectional view of the supply terminal assembly partially disassembled with the secondary valve closed;

FIG. 4 is a fragmentary rear elevational view of the latched assembly mounted to the wall plate;

FIG. 5 is a cross-sectional view taken on line 5—5 of FIG. 4;

FIG. 6 is a cross-sectional view of a modified coupler assembly with matching, opposed sections mounted in a wall and served by a common supply pipe;

FIG. 7 is a cross-sectional view of another embodiment of a coupler assembly, similar to the embodiment of FIG.

2, but showing the supply port at the rear of the secondary poppet valve means;

FIG. 8 is an enlarged cross-sectional view of the thrust washer;

FIG. 9 is an enlarged cross-sectional view of the main valve plug;

FIG. 10 is a side elevational view of the secondary poppet valve means;

FIG. 11 is an end view of the poppet valve means shown in FIG. 10;

FIG. 12 is a side elevational view, partly in cross-section, of the modified secondary poppet valve means used in the embodiment of FIG. 7, and FIG. 13 is an end elevational view of the secondary poppet valve means shown in FIG. 12.

Description of the preferred embodiments

Referring now by characters of reference to the drawings, the coupler assembly consists of a supply terminal assembly generally indicated by 10, and a hose terminal fitting referred to by 11.

The supply terminal assembly, disclosed in the embodiment of FIGS. 2–5 includes a base 12 having an elongate sleeve 13 threadedly connected to an end cap 14. The end cap 14 is mounted in the rear wall 15 of a receptacle box 16, and the elongate sleeve 13 extends into the interior of the box 16. A wall plate 17 covers the box 16.

As is best seen in FIG. 3, the base 12 including the sleeve 13 and end cap 14 is provided with an elongate internal chamber 20. The inner end of the elongate sleeve 13 is provided with an internal valve seat 21 defining a secondary valve port 22 in the chamber 20 between the chamber portion defined by the sleeve 12 and the chamber portion defined by the end cap 14.

From FIG. 3, it will be apparent that the chamber portion in end cap 14 is partially defined by a support surface 23 directly opposite the valve port 22.

Communicating with the chamber 20 at one side of the chamber portion in end cap 14 and at one side of the secondary valve port 22, is a supply port 24. Attached to the end cap 14 and communicating with the supply port 24 is a supply pipe 25. The supply port 24 is located between the secondary valve port 22 and the support surface 23.

An elongate tubular socket member 26 is located within the sleeve 13. The tubular socket member 26 includes a threaded portion 27 operatively engaging and interfitting the coacting internal threads 30 in sleeve 13. The socket member includes an enlarged head 31 at its outer end which is affixed to the wall plate 17 by a pair of screws 32 as is shown in FIG. 2. The location of the head 31 can be precisely determined by the threaded engagement of the threaded portion 27 with the internal threads 30, thereby longitudinally positioning the socket member 26 in the elongate sleeve 13. When the tubular socket member 26 is inserted into and threadedly connected to the sleeve 13, the socket member 26 will engage sealingly the O-ring 29 retained by the sleeve 13. The inner end 33 of the socket member 26 is located closely adjacent to that partition of the sleeve 13 in which the valve port 32 is formed.

The socket member 26 is tubular and provides a bore 34 that constitutes a part of the longitudinal chamber 20. The bore 34 provides a valve plug opening 35 extending through the enlarged head 31. Located within the bore 34 and carried by the socket member 26 is a primary valve plug 36, the details of which are best shown in FIG. 9. The primary valve plug 36 includes a nose 37 that normally lies flush with the outer surface of enlarged head 31 while located in the valve opening 35, as is best shown in FIG. 2.

From FIG. 9 it is clear that the primary valve plug 36 includes an enlarged head portion 38 that engages a coacting shoulder formed on the interior of the socket member 26 to limit the forward movement of the valve plug 36 into the valve opening 35. A passage 40 is formed in the primary valve plug 36 that is closed when the plug 36 is located in its forwardmost position in the valve opening 35, and is opened when the plug 36 is retracted. A pair of O-rings 41, one of which is carried by the primary valve plug 36 and the other of which is carried by the head 31 at the valve opening 35, provide effective seals when the primary valve plug 36 is closed.

As shown in FIG. 2, the wall plate 17 is provided with a latch plug opening 42 below the valve plug opening 35, the purpose and function of which will be later described upon more detailed description of parts.

The poppet valve means and pusher system includes a poppet valve member 43, the structure of which is best shown in FIGS. 10 and 11. The poppet valve member 43 has a head portion 44 of a diameter that closely approximates the diameter of the chamber 20 in which the poppet valve member 43 is located at one side of the valve port 22. The head 44 is provided with flattened sides 45 to provide radial spaces between the poppet valve member 43 and the wall of this chamber portion. The poppet valve member 43 includes a forwardly tapered nose 46 adapted to interfit the valve port 22 when the poppet valve member 43 is in its closed position. A valve seal 47 is retained by the poppet valve member 43 just behind the tapered nose 46, the seal 47 being retained by and between annular flanges 50 and 51. The seal 47 engages the valve seat 31 and effectively closes the valve port 22 when the poppet valve member 43 is in its closed position.

Located within the elongate chamber 20 at the other side of the valve port 22, is a thrust washer 52, the construction of which is best shown in FIG. 8. The thrust washer 52 includes a tubular body 53 having a passage 54 formed axially therethrough. Extending outwardly from one end of the washer body 53 is an annular flange 54, the flange 54 having a tapered nose 55 adapted to interfit the bore 34 formed in the tubular end of the socket member 26. A shoulder 56 formed integrally with and extending radially outward from the tapered nose 55 engages the end 33 of the socket member 26. The washer body 53 extends into the valve port 22 and is spaced radially from the margin defining such valve port 22.

A compression spring 57, constituting resilient means, is disposed operatively between and interconnects poppet valve member 43 and the thrust washer 52. One end of the compression spring 57 engages the tapered nose 46 of the poppet valve member 43, while the opposite end of spring 57 is located about the washer body 53 and engages the rear of the annular flange 54. The spring 57 closely approximates the diameter of the valve port 22 and tends to guide the longitudinal movement of both the poppet valve member 43 and the thrust washer 52. The compression spring 57 tends to urge the poppet valve member 43 and the thrust washer 52 relatively apart so that the thrust washer 52 will follow the socket member 26 as the socket member 26 is threadedly withdrawn, and tends to hold the poppet valve member 43 in its open position away from the valve port 22 when the socket member 26 is inserted and the thrust washer 52 is depressed to the operative position shown in FIG. 2.

The latch mechanism includes a bracket 60 fixed to the rear side of wall plate 17, the bracket 60 having holes aligned with the screws 32, the valve opening 35, and the latch plug opening 42. As is best shown in FIG. 2, the head 31 of the socket member 26 is fixed to the bracket 60 by the screws 32.

A latch arm, generally referred to by 61, has one end 62 pivotally mounted to the bracket 60, the latch arm 61 being reversed from this pivotally mounted end 62 to provide a catch shoulder 63 normally aligned just in back of the latch plug opening 42. The latch arm 61 then extends upwardly and provides a manipulating tip 64 extending outwardly through the wall plate 17 through an elongate opening 65.

Disposed about the latch arm end 62 and located between the laterally spaced walls of bracket 60, is a torsion spring 66. One end 67 of torsion spring 66 engages the bracket 60 while the opposite end 68 engages the reversed portion of the latch arm 61, thereby tending to hold the catch shoulder 63 aligned with the latch plug opening 42.

As is best shown in FIG. 1, the hose terminal fitting 11 consists of a bridge piece 70 that carries a tubular valve plug 71 and a latch plug 72. One end of the valve plug is attached to a hose 73, while the other end is adapted to be inserted into the valve plug opening 35 of the socket member 26. The innermost end of valve plug 71 is tapered and is provided with a series of openings 74 communicating with the bore of the plug 71.

When the socket member 26 is threadedly connected into the sleeve 13, the end 33 engages the thrust washer 52 and pushes the thrust washer 52 rearwardly from the position shown in FIG. 3 to the position shown in FIG. 2. As the thrust washer 52 is moved rearwardly, the compression spring 57 will move the poppet valve member 43 away from the valve port 22 and against the support surface 23. The spring 57, under compression, tends to urge the poppet valve member 43 and the thrust washer 52 relatively apart so that the poppet valve member 43 is urged under pressure against the support surface 23 and the thrust washer 52 is urged under loading against the end 33 of socket member 26. The secondary valve port 22 is now open for flow from the supply pipe 25 into the chamber 20 and through the valve port 22. The fluid pressure will urge the primary valve plug 36 forwardly into the bore 34 to close the primary valve opening 35.

To connect the hose terminal fitting 11 to the supply terminal assembly 10, the valve plug 71 is inserted into the valve opening 35 of socket member 26, and the latch plug 72 is inserted into the latch plug opening 42. As the valve plug 71 is moved inwardly, the valve plug 71 depresses the movable valve plug 36 until the passage 41 is opened, thus placing the plug 71 in communication with the chamber 20.

As the latch plug 72 is moved inwardly, it depresses the catch shoulder 63 and pivots the latch arm 61 about its pivoted end 62, against the loading of the torsion spring 66. When fully inserted, the latch plug 72 will effectively engage the catch shoulder 63 so as to preclude unintentional withdrawal.

To disconnect the hose terminal fitting 11 from the supply terminal assembly 10, the tip 64 of the latch arm 61 is depressed so as to pivot the latch arm 61 against the loading of the torsion spring 66 so as to move the catch shoulder 63 out of effective engagement with the latch plug 72. Then, the valve plug 71 and the latch plug 72 are simply withdrawn. The fluid under pressure will move the valve plug 36 forwardly to close the valve opening 35.

If for any reason it is desired to remove the socket member 26 or otherwise disassemble this part, the secondary valve port 22 will be automatically closed. When the socket member 26 is threadedly withdrawn, the thrust washer 52 will follow the end 33 of the socket member 26 under the loading of the compression spring 57. When the socket member 26 is fully withdrawn, the fluid pressure will urge the poppet valve member 43 away from its support seat 23 and into sealing engagement with the valve seat 21, thereby closing the secondary valve port 22. The spring 57 guides both the poppet valve member 43 and the thrust washer 52 during this movement.

FIG. 6 shows a modification of the supply terminal assembly in which a pair of outlet stations are arranged in oppositely facing relation. Because most of the component parts of the outlet stations shown in FIG. 6 are identical with those parts found in the embodiment of FIGS. 1-5 inclusive, corresponding parts will be given corresponding reference numerals wherever possible. The primary distinction consists in the arrangement of a pair of tubular sleeves 13 in longitudinal, opposed alignment, the sleeves 13 being operatively interconnected by a common end cap 75. It will be understood that the embodiment of FIG. 6 consists essentially of a pair of units similar to the embodiment of FIG. 2 disposed in back-to-back relation. The support surface for both of the poppet valve members in the embodiment of FIG. 6 is provided by an intermediate lock ring 76. The supply pipe 25 communicates with the aligned longitudinal chambers 20 through a supply port 77 located between the poppet valve members 43.

In the FIG. 6 embodiment, each poppet valve member 43 is held against the common, intermediate lock ring 76 under the loading of the associated compression spring 57, thereby opening the associated secondary valve port 22. Upon removal of either one or both of the socket members 26 in the FIG. 6 embodiment, each thrust washer 52 will follow its associated socket member 26 under the loading of its associated compression spring 57, and when the socket member 26 is fully withdrawn, the associated poppet valve member 43 will be urged to a closed position relative to its associated valve port 22 under fluid pressure.

The embodiment of FIG. 7 is also similar to the embodiment of FIG. 2 but relates to an assembly that is not flush with the wall. However, most of the component parts of the FIG. 7 embodiment are identical with those previously described in the FIG. 2 embodiment, and therefore, corresponding parts will be given identical reference numerals wherever possible. The main distinction of the FIG. 7 embodiment resides in the fact that the end cap 80, threadedly connected to the tubular sleeve 13, is provided with an elongate threaded fitting 81 in which the supply port 82 is formed. The supply port 82 communicates with the chamber through the support surface 83 behind a poppet valve member 84 that is of a slightly different construction than the poppet valve member 43 previously described. A detailed construction of the poppet valve member 84 is best shown in FIGS. 12 and 13. The supply pipe 25 is operatively connected to the end cap 80 through the supply port 82.

The construction of the poppet valve member 84 utilized in the FIG. 7 embodiment is closely similar to the construction of poppet valve member 43 so that corresponding identical parts will be given the same reference numeral wherever possible. Primarily, the poppet valve member 84 differs from the poppet valve member 43 by the provision of an elongate body 85 at the rear of the head 44, the elongate body 85 slidably interfitting the supply port 82 for guiding movement of the poppet valve member 84 between its opened and closed positions. The elongate body 85 is provided with a center passage 86 opening at the rear and communicating with radially extending holes 87 communicating with the space between the flattened surfaces 45 and the wall defining the chamber portion in which the poppet valve member 84 slidably moves.

The operation of the component parts of the supply terminal assembly of the FIG. 7 embodiment is substantially the same at that previously described with respect to the FIG. 2 embodiment. For example, upon insertion of the socket member 26, the end 33 of the socket member 26 engages the thrust washer 52 and urges the thrust washer 52 rearwardly to the position illustrated in FIG. 7. As the thrust washer 52 moves rearwardly, the compression spring 57 will move the poppet valve member 84 away from the valve port 22 and will urge the poppet valve member 84 against the support surface 83. The elongate body 85, moving in the supply port 82, guides the poppet valve member 84 during this rearward movement.

Upon withdrawal of the socket member 26, the thrust washer 52 will follow the end 33 of the socket member 26 under the loading spring 57. After withdrawal of the socket member 26, the fluid pressure in the supply port 82 and in the chamber behind the poppet valve member 84 moves the poppet valve member 84 forwardly into sealing engagement with the valve seat 21, thereby effectively closing the valve port 22. Again, the elongate body 82 guides the poppet valve member 84 during this forward movement.

Although the invention has been described by making detailed reference to several preferred embodiments, such detail is to be understood in an instructive, rather than in any restrictive sense, many variants being possible within the scope of the claims hereunto appended.

I claim as my invention:

1. In a coupler assembly, a supply terminal assembly adapted to receive and coact with a tubular plug, the improvement comprising:
   (a) base provided with a longitudinal chamber,
   (b) a tubular socket member carried by the base and received in the chamber, the socket member being longitudinally adjustable in the chamber,
   (c) means providing a valve port in the chamber behind the tubular socket member,
   (d) a poppet valve means slidably mounted in the chamber at one side of the valve port,
   (e) a thrust washer in the chamber, the thrust washer being engageable and movable with the tubular socket member, and
   (f) a resilient means tending to move the thrust washer and poppet valve means apart, the tubular socket member positioning the thrust washer in the chamber while resilient means holds the poppet valve means away from the valve port for flow through the valve port, and
   (g) the thrust washer following the tubular socket member under loading of the resilient means during withdrawal of the socket member from the chamber, and
   (h) the poppet valve means closing the valve port under pressure exerted in the chamber at said one side of the valve port when the socket member is withdrawn.

2. A coupler assembly as defined in claim 1, in which:
   (i) the thrust washer includes a flange engageable with the end of the tubular socket member for positioning the thrust washer longitudinally in the chamber.

3. A coupler assembly as defined in claim 1, in which:
   (i) the thrust washer includes an annular flange having a substantially frusto-conical nose interfitting the end of the tubular socket member, and having an integral radial shoulder engaging the end of the tubular socket member for positioning the thrust washer longitudinally in the chamber.

4. A coupler assembly as defined in claim 1, in which:
   (i) the thrust washer includes:
      (1) a tubular washer body extending into the valve port and having a passage for flow therethrough, and
      (2) an annular flange engageable with the end of the tubular socket member for positioning the thrust washer longitudinally in the chamber with the tubular washer body located in the valve port.

5. A coupler assembly, as defined in claim 4, in which:
   (j) the resilient means includes a compression spring having one end located about the tubular washer body and engaging the flange, and disposed between the tubular washer body and the margin defining the valve port.

6. A coupler assembly, as defined in claim 1, in which:
   (i) the base provides a support for the poppet valve means at said one side of the valve port,
   (j) the resilient means holds the poppet valve means against the support, and
   (k) the base is provided with a supply port at the side of the chamber between the support and the valve port.

7. A coupler assembly as defined in claim 6, in which:
   (l) the valve port is defined by a valve seat,
   (m) the poppet valve means includes a sealing member engageable with the valve seat to close the port,
   (n) the thrust washer includes:
      (1) a tubular washer body extending into the valve port and having a passage for flow therethrough, and
      (2) an annular flange engageable with the end of the tubular socket member for positioning the thrust washer in the chamber with the tubular washer body disposed in the valve port and spaced from the valve seat, and
   (o) the resilient means includes a compression spring having one end located about the tubular washer body and engaging the flange, and disposed between the tubular washer body and the valve seat.

8. A coupler assembly as defined in claim 6, in which:
   (l) the poppet valve means is at one side of the supply port when held against the support, and is at the opposite side of the supply port when closing the valve port.

9. A coupler assembly as defined in claim 1, in which:
   (i) the base provides a support for the poppet valve means at said one side of the valve port,
   (j) the resilient means holds the poppet valve means against the support,
   (k) the base is provided with a supply port in the support behind the poppet valve means, and
   (l) the poppet valve means is provided with a passage therethrough to place the supply port in communication with the chamber when the poppet valve means is urged against the support.

10. A coupler assembly as defined in claim 9, in which:
    (m) the chamber in which the poppet valve means is slidably mounted has a substantially cylindrical wall,
    (n) the poppet valve means includes a body with an enlarged head slidably engaging the substantially cylindrical wall, the head having peripheral portions spaced from the wall, and
    (o) the body of the poppet valve means includes a passage in its end and communicating the supply port with space between the head and chamber wall.

11. A coupler assembly as defined in claim 9, in which:
    (m) the poppet valve means includes an elongate body slidably mounted and guided in the supply port, the body being provided with the passage placing the supply port in communication with the chamber.

12. A coupler assembly as defined in claim 9, in which:
    (m) the thrust washer includes:
       (1) a tubular washer body extending into the valve port and having a passage for flow therethrough, and
       (2) an annular flange engageable with the end of the tubular socket member for positioning the thrust washer longitudinally in the chamber with the tubular washer body located in the valve port and spaced from the margin defining the valve port, and
    (n) the resilient means includes a compression spring having one end located about the tubular washer body and engaging the flange, and disposed between the tubular washer body and margin of the valve port, the spring engaging the margin of the valve port to guide movement of both thrust washer and poppet valve means.

13. A coupler assembly as defined in claim 1, wherein the supply terminal assembly is adapted to receive and cooperate with a pair of tubular plugs, in which:
    (i) the base is provided with a pair of longitudinal chambers that are axially aligned,
    (j) a pair of tubular socket members are carried by the base, one socket member being received in each chamber, each socket member is longitudinally adjustable in its associated chamber,
    (k) the means in the base provides a pair of valve ports, one valve port being located in each chamber behind the associated socket member,
    (l) a poppet valve means is slidably mounted in each chamber at one side of the associated valve port, (m) a thrust washer is located in each chamber, each thrust washer being engageable and moveable with the associated socket member, (n) a resilient means operatively connects each pair of associated thrust washer and poppet valve means, and tends to move the associated washer and valve means apart, (o) the support means is carried by the base and is located between the pair of poppet valve means, the support means positioning the pair of poppet valve means in their open position relative to their associated valve ports, (p) the base is provided with a common supply port at the side of the chambers between the pair of poppet valve means, and (q) each tubular socket member positions its associated thrust washer in its associated chamber, while the associated resilient means holds the associated poppet valve means away from its associated valve port for flow through the valve port, the thrust washer following its associated tubular socket member under loading of its associated resilient means upon withdrawal of the associated socket member from its associated chamber, and the poppet valve means closing its associated valve port under pressure exerted in the associated chamber at the said one side of the associated valve port when the thrust washer is withdrawn.

14. A coupler assembly as defined in claim 13, in which:

(r) each thrust washer includes a flange engageable with the end of the associated tubular socket member for positioning the thrust washer longitudinally in the associated chamber.

15. A coupler assembly as defined in claim 13, in which:

(r) each thrust washer includes:
  (1) a tubular washer body extending into the associated valve port and having a passage for flow therethrough, and
  (2) an annular flange engageable with the end of the associated tubular socket member for positioning the thrust washer in the associated chamber with the tubular washer body located in the associated valve port.

16. A coupler assembly as defined in claim 13, in which:

(r) each chamber in which the associated poppet valve means is slidably mounted has a substantially cylindrical wall, (s) each poppet valve means includes a body with an enlarged head slidably engaging the associated substantially cylindrical wall, the head having peripheral portions spaced from said wall, and the body of each poppet valve means includes a passage in its end and communicating with the common supply port through the space between the peripheral head portions and the associated chamber wall.

17. A coupler assembly as defined in claim 16, in which:

(t) each thrust washer includes:
  (1) a tubular washer body extending into the associated valve port and having a passage for flow therethrough, and
  (2) an annular flange engageable with the end of the associated tubular socket member for positioning the thrust washer in the associated chamber with the tubular washer body located in the associated valve port and spaced from the margin of the valve port, and (u) each resilient means includes a compression spring having one end located about the associated tubular washer body and engaging the flange, and disposed between the associated tubular washer body and the margin of the associated valve port, the spring engaging the margin of the valve port to guide movement of both the associated thrust washer and poppet valve means.

References Cited

UNITED STATES PATENTS 2,771,308 11/1956 Vitcha et al. _____ 137—329.1 X
2,908,511 10/1959 Rogers _____ 137—329.1

WILLIAM F. O'DEA, *Primary Examiner.*

D. R. MATTEWS, *Assistant Examiner.*

U.S. Cl. X.R.

251—149.6; 137—614.11, 360, 315